United States Patent [19]
Takanashi

[11] Patent Number: 5,638,155
[45] Date of Patent: Jun. 10, 1997

[54] PHOTOGRAPHIC PRINTER AND METHOD FOR CONTROLLING PHOTOGRAPHIC PRINTER

[75] Inventor: Teruo Takanashi, Kanagawa, Japan

[73] Assignee: Fuji Photo Film Co., Ltd., Kanagawa, Japan

[21] Appl. No.: 511,153

[22] Filed: Aug. 4, 1995

[30] Foreign Application Priority Data

Sep. 8, 1994 [JP] Japan .................................. 6-214995

[51] Int. Cl.$^6$ .................................................. G03B 27/73
[52] U.S. Cl. ............................... 355/71; 355/38; 355/41
[58] Field of Search ................................. 355/67, 68, 69, 355/38, 40, 41

[56] References Cited

U.S. PATENT DOCUMENTS

| | | | |
|---|---|---|---|
| 5,006,886 | 4/1991 | Suzuki | 355/38 X |
| 5,121,159 | 6/1992 | Ujiie | 355/38 |
| 5,392,093 | 2/1995 | Kojima | 355/38 |

Primary Examiner—Matthew S. Smith
Assistant Examiner—David A. Lane
Attorney, Agent, or Firm—Sughrue, Mion, Zinn, Macpeak & Seas

[57] ABSTRACT

In a photographic printer including a print-exposing device having a light source and a light controlling filter, an image recorded onto a film is printed on a photosensitive material by irradiating, onto the photosensitive material, light emitted from the light source and transmitted through the light controlling filter and the film. The light transmitted through the light controlling filter and the film is incident upon a photometric device, and the photometric device photometrically measures the image recorded on the film. The quantity of light incident upon the photometric device is controlled by a control device so as to reduce the quantity of light to a quantity of light which is lower than a quantity of light when printing exposure is carried out, in a case in which printing exposure by said print-exposing device is suspended for a time longer than a predetermined time. In a state in which printing exposure is not performed for a time longer than the predetermined time, the quantity of light incident upon the photometric device is reduced to a level lower than that of the quantity of light during printing exposure. Therefore, deterioration of the photometric device due to sticking and the like is mitigated, and the life thereof can be extended. Further, labor for maintenance such as replacement and inspection of the photometric device is reduced.

20 Claims, 6 Drawing Sheets

PHOTOGRAPHIC PRINTER AND METHOD FOR CONTROLLING PHOTOGRAPHIC PRINTER

BACKGROUND OF THE INVENTION

1. Field of the Invention

The present invention relates to a photographic printer and more particularly, to a photographic printer in which an image recorded on a film is photometrically measured by light emitted from a light source and the light is transmitted through a light controlling filter and the film, and thereafter, the image recorded on the film is printed onto a photosensitive material by irradiating the light, which was transmitted through the light controlling filter and the film, onto the photosensitive material.

2. Description of the Related Art

In a conventional photographic printer, before an image recorded on a film is printed on a photosensitive material, light emitted from a light source and transmitted through a film is separated into red, green and blue through photometric filters, and is received by optical sensor to measure (photometrically measure) the amount of the transmitted light of each color. Exposure control techniques, in which exposing conditions for printing the photosensitive material for each color are computed based upon the measured data, have been known.

Further, in recent years, photographic printers equipped with photometric means have generally been used for obtaining exact printing exposure conditions In accordance with the subject matter of images. In such printers, an image recorded on a film is divided into a number of pixels and each of the pixels is separated into red, green and blue colors and photometrically measured by the photometric means. The above photometric means can be realized by using a CCD as a light detecting sensor and a gelatin filter (i.e., filter manufactured by sandwiching, between a pair of glass plates, a gelatin layer which absorbs aqueous solution containing a mixture of several tens of organic dyestuffs) as a photometric filter.

A light source installed in a photographic printer requires some time to recover illuminance of light emitted from the light source when light emission is restarted after having been once stopped. Therefore, emission of light is continued while printing exposure is not carried out so enable restarting in a short time after printing exposure is temporarily stopped. Accordingly, the light controlling filter, the CCD and the gelatin filter are always irradiated by light. In general, the light controlling filter formed by a metal deposited filter is not prone to fading, and therefore, there is no concern that the filter will deteriorate even if the filter is irradiated all the time. In contrast, the gelatin filter tends to fade when strong light is irradiated thereto for a long period of time. A drawback arises in that such fading promotes deterioration in the performance of the gelatin filter. Further, the light detecting sensor such as a CCD causes sticking and the like, and has a drawback in that the function thereof deteriorates when strong light Is irradiated thereto for a long time.

SUMMARY OF THE INVENTION

In view of the foregoing drawbacks, an object of the present invention is to provide a photographic printer and method for controlling a photographic printer which are capable of reducing deterioration of a photometric device and extending the life thereof.

A first aspect of the present invention is a photographic printer comprising a print-exposing device which has a light source and a light controlling filter and in which an image recorded on a film is print-exposed onto a photosensitive material by irradiating light, which has been emitted from said light source and transmitted through said light controlling filter and the film, onto said photosensitive material; a photometric device upon which light transmitted through said light controlling filter and the film is incident, for photometrically measuring the image recorded on the film; and a control device for controlling a quantity of light incident upon said photometric device to reduce the quantity of light to a quantity of light which is lower than a quantity of light when printing exposure is carried out, in a case in which printing exposure by said print-exposing device is suspended for a time longer than a predetermined time.

A second aspect of the present invention is a photographic printer according to the first aspect of the present invention, and further comprises: a lens system provided at an optical path upstream side of said photometric device; and a magnification changing device for changing a magnification of said lens system; wherein said control device changes the magnification of said lens system by means of said magnification changing device to reduce the quantity of light incident upon said photometric device to a quantity of light which is lower than a quantity of light when printing exposure is carried out, in a case in which printing exposure by said print-exposing device is suspended for a time longer than a predetermined time.

A third aspect of the present invention is a photographic printer comprises: a print-exposing device which has a light source and a light controlling filter and in which an image recorded on a film is print-exposed onto a photosensitive material by irradiating light, which has been emitted from said light source and transmitted through said light controlling filter and the film, onto the photosensitive material; a photometric device upon which light transmitted through said light controlling filter and the film is incident, for photometrically measuring the image recorded on the film; an illuminance adjusting device for adjusting illuminance of said light source; a filter moving device for moving said light controlling filter; and a control device for performing at least one of the following (a) and (b): (a) controlling illuminance of said light source by means of said illuminance adjusting device to reduce the illuminance of said light source to illuminance of said light source which is lower than illuminance of said light source when printing exposure is carried out, in a case in which printing exposure by said print-exposing device is suspended for a time longer than a predetermined time, and (b) controlling movement of said light controlling filter by means of said filter moving device to reduce a quantity of light transmitted through said light controlling filter to a quantity of light which is lower than a quantity of light when printing exposure is carried out, in a case in which printing exposure by said print-exposing device is suspended for a time longer than a predetermined time.

A fourth aspect of the present invention is a method of controlling a photographic printer comprises the steps of: providing a print-exposing device which has a light source and a light controlling filter and in which an image recorded on a film is print-exposed onto a photosensitive material by irradiating light, which has been emitted from said light source and transmitted through said light controlling filter and the film, onto said photosensitive material, and providing a photometric device upon which light transmitted through said light controlling filter and the film is incident, for photometrically measuring the image recorded on the film; judging whether printing exposure by said print-exposing device has been suspended for a time longer than a predetermined time; and controlling a quantity of light incident upon said photometric device so as to reduce the quantity of light to a quantity of light which is lower than a quantity of light when printing exposure is carried out, in a case in which printing exposure by said print-exposing device is suspended for a time longer than a predetermined time.

In accordance with the first aspect of the present invention, the control device controls the quantity of light incident upon the photometric device so as to reduce the quantity of light to a quantity of light which is lower than a quantity of light when printing exposure is carried out, in a case in which printing exposure by said print-exposing device is suspended for a time longer than a predetermined time.

Accordingly, in a state in which printing exposure is not performed for a time longer than a predetermined time, the quantity of light incident upon the photometric device is made lower than the quantity of light when printing exposure is performed, so that deterioration such as sticking of the photometric device can be avoided, and the life thereof can be extended. In particular, when the photometric device comprises a gelatin filter which is prone to fading and a CCD which is prone to sticking, the above effects are clearly realized. In addition, since the life of the photometric device can be prolonged for longer than that of conventional devices, labor involved in maintenance, such as replacement and inspection of the photometric device, can be reduced. Further, a reduction of running costs can be achieved due to a reduction in the number of components which must be replaced.

In accordance with a photographic printer of the second aspect of the present invention, in the photographic printer described in the first aspect, the control device changes the magnification of the lens system by means of the magnification changing device so as to reduce the quantity of light incident upon the photometric device when printing exposure by the print-exposing device is not performed for a time longer than a predetermined time. In accordance with this process, in a state in which printing exposure is not carried out for a time longer than a predetermined time, the quantity of light is reduced (more specifically, the quantity of light per unit area incident upon the photometric device is reduced) so that the effects of the present invention are further enhanced. Accordingly, the photometric device deteriorates less, and the life thereof can be extended.

In accordance with a photographic printer described in the third aspect of the present invention, when printing exposure by the print-exposing device is suspended for a time longer than a predetermined time, at least one of the following (a) and (b) is performed: (a) the control device controls adjustment of illuminance of the light source by means of the illuminance adjusting device so as to reduce the illuminance of the light source to an illuminance which is lower than the illuminance when printing exposure is performed; and (b) the control device controls movement of the light controlling filter by means of the filter moving device so as to reduce the quantity of light transmitted through the light controlling filter to a quantity of light which is lower than the quantity of light during printing exposure.

In accordance with this process, when printing exposure is not carried out for a time longer than a predetermined time, the quantity of light incident upon the photometric device is lowered to a quantity of light which is lower than the quantity of light during printing exposure. The effects of the third aspect of the invention are as marked as those of the first aspect of the present invention.

Further, effects of the present invention, i.e., a reduction in the deterioration of the photometric device and consequent extension of the life of the photometric device, are at their greatest when the illuminance of the light source is adjusted by the illuminance adjusting device to a minimum illuminance and the light controlling filter is completely closed by the filter moving device.

Moreover, since the life of the photometric device can be extended to longer than that of a conventional photometric device, labor involved in maintenance, such as replacement and inspection of the photometric device, and more specifically, replacement and inspection of the light detecting sensor such as a CCD and the gelatin filter or the like placed in front of the photometric surface of the light detection sensor, can be reduced. Running costs can be reduced in accordance with the reduction in the number of components which must be replaced. Furthermore, in a case in which an adjustment is made by the illuminance adjusting device to reduce the illuminance of the light source, the emission of light is not stopped, and therefore, time for recovering the illuminance is not required as in the case in which the emission of light is stopped. Accordingly, it is possible to restart the emission of light in a short period of time as in the conventional art.

In accordance with the fourth aspect of the present invention, a judgment is made as to whether printing exposure by the print-exposing device has been suspended for a time longer than a predetermined time. When printing exposure by the print-exposing device has been suspended for a time longer than a predetermined time, the light incident upon the photometric device is controlled so as to reduce the quantity of light to a lower level than that during printing exposure. In a state in which printing exposure is not performed for a time longer than a predetermined time, the quantity of light incident upon the photometric device is lowered to a quantity less than the quantity of light when printing exposure is performed so that deterioration of the photometric device such as sticking can be avoided and the life thereof can be prolonged. Moreover, since the life of the photometric device can be prolonged to longer than that of conventional devices, labor for maintenance such as replacement and inspection of the photometric device can be reduced, and a reduction in running costs can be achieved by reducing the number of components which must be replaced.

DESCRIPTION OF THE PREFERRED EMBODIMENT

An embodiment of the photographic printer in accordance with the present invention will be described hereinafter with reference to the drawings.

Figure 1:
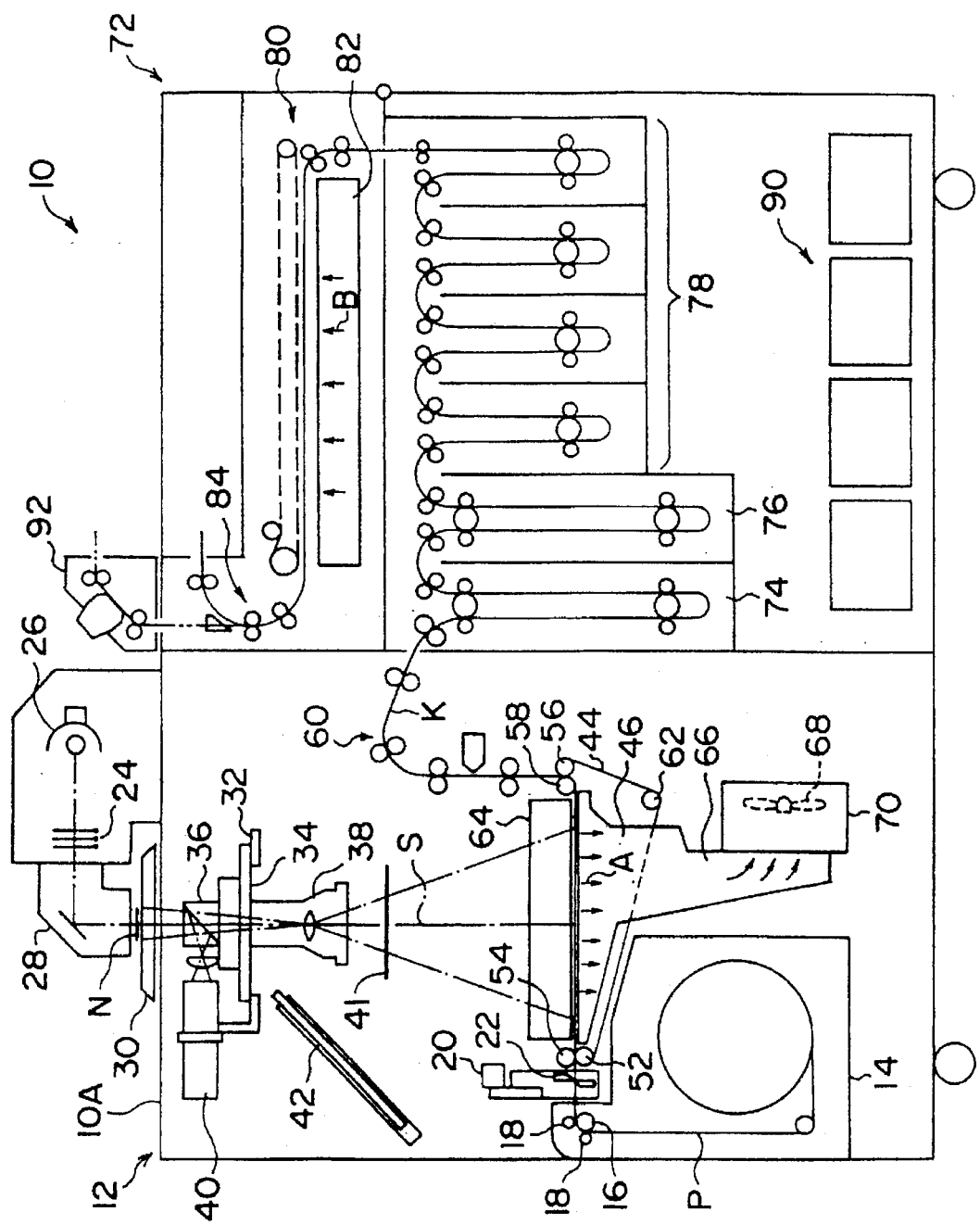
FIG. 1 is a schematic structural view showing a printer-processor including a photographic printing station in accordance with an embodiment of the present invention.

FIG. 1 shows a schematic view of a printer-processor 10 according to the present invention in which a paper magazine 14 containing photographic printing paper P can be loaded into a photographic printing station 12, which serves as a photographic printer of the present invention and which constitutes the printer portion of the printer-processor 10.

In FIG. 1, a drive roller 16, on which the leading end of the photographic printing paper P is wound, is rotatably supported at the upper left of the paper magazine 14. The drive roller 16 is rotated by the driving force of a motor (not shown) in the photographic printing station 12. A pair of nip rollers 18 is provided at a position facing the drive roller 16 via the photographic printing paper P. Accordingly, the photographic printing paper P nipped between the drive roller 16 and the nip rollers 18 is conveyed into the photographic printing station 12 by the drive roller 16.

A cutter 22 consisting of an upper blade and a lower blade driven by a motor 20 is provided at the conveying direction downstream side of the photographic printing paper P with respect to the drive roller 16 and the nip rollers 18. The photographic printing paper P conveyed out of the paper magazine 14 is promptly cut by the cutter 22.

In FIG. 1, a supporting stand 46 having an upper surface along the horizontal direction (right and left direction in FIG. 1) Is located at the right side of the cutter 22 (i.e., at the downstream side in the conveying direction of the photographic printing paper P). A winding roller 52, around which an endless belt 44 is trained and which has an axis along the horizontal direction (in the direction perpendicular to the drawing surface of FIG. 1), is located between the supporting stand 46 and the cutter 22. A nip roller 54 is provided above the winding roller 52 such that the endless belt 44 is nipped between the winding roller 82 and the nip roller 54. A guide roller 56, around which the endless belt 44 is trained, is located at the photographic printing paper P conveying direction downstream side of the supporting stand 46. A press roller 58, the lower surface of which is positioned at the same height as the upper surface of the winding roller 52, is located adjacent to the guide roller 86 and between the guide roller 56 and the supporting stand 46. The press roller 58 presses the periphery of the endless belt 44. Specifically, the endless belt 44 forms an S-shape at this portion as shown in FIG. 1. Further, the endless belt 44 is wound around a tension roller 62 under the guide roller 56 so as to form a triangular locus of movement. Thus, the guide roller 56 is rotated by the driving force of a motor (not shown) to rotate the endless belt 44 in the clockwise direction as shown in FIG. 1.

A number of small holes (not shown) are formed in the entire area of the endless belt 44 and a number of hole portions (not shown) corresponding to the small holes of the endless belt 44 are formed on the upper surface of the supporting stand 46 on which a portion of the endless belt 44 is placed. Further, the interior of the supporting stand 46 is hollow. A pair of communication ducts 66 (only one of the ducts is illustrated in FIG. 1), which are formed so as to correspond to the transverse direction ends of the endless belt 44, are connected to the supporting stand 46. The communication ducts 66 bypass the portion of the endless belt 44 which passes under the supporting stand 46, extend to below the endless belt 44, and are connected to a fan box 70 which is provided with a suction fan 68. As shown in Fig., an easel device 64 is provided above the portion of the endless belt 44 which portion moves on the supporting stand 46. In cases in which an image with borders is printed onto the photographic printing paper P, the periphery of the photographic printing paper P is covered by an illustrated movable member (paper mask) within the easel device 64.

A diffusion box 28 which diffuses light is located a position directly above the easel device 64 and at the exterior of a casing 10A which forms an outer frame of the printer-processor 10. A CC filter 24, which serves as a light controlling filter and comprises three filters of C (cyan), M (magenta) and Y (yellow) and is movable so as to change the amount of each filter inserted into the optical path, is disposed adjacent to the diffusion box 28 at the right side thereof (i.e., at the upstream side of the optical path). Accordingly, the light emitted from the light source 26 adjacent to the CC filter 24 is diffused and reflected through the diffusion box 28 after passing through the CC filter 24, and is directed downward of the photographic printing station 12. Thereafter, the light is transmitted through a negative film N on a negative carrier 30 placed on the upper surface of the casing 10A A supporting plate 34 is movably supported by guide rails 32 installed inside the photographic printing station 12 in the horizontal direction (the direction perpendicular to the surface of FIG. 1). A prism 36 and a zoom lens 38 are mounted to the support plate 34 so as to be disposed on the optical axis S. Therefore, the light transmitted through the negative film N passes through the prism 36 and further passes through the zoom lens 38 which is capable of changing magnification, so that an image on the negative film F is focused on the photographic printing paper P under the easel device 64.

A density measuring device 40, which will be described in detail later, and which comprises a light detecting sensor such as a CCD for measuring optical density of the negative film N, color filters, and the like, is disposed in the photographic printing station 12. The light reflected in the horizontal direction by the prism 36 is incident upon the density measuring device 40.

Furthermore, on the optical path between the zoom lens 38 and the easel device 64, a black shutter 41 is provided for controlling the amount of time which the photographic printing paper P is exposed to the light whose color and intensity have been adjusted by the CC filter 24 which has been transmitted through the negative film N.

Since the photographic printing station 12 is constructed in the above-described manner, after the photographic printing paper P delivered out of the paper magazine 14 is cut by the cutter 22 to a desired length, the photographic printing paper P is placed on the endless belt 44 and is conveyed to the image printing position on the optical axis S of the exposing light. The exposing light transmitted through the prism 36, the zoom lens 38 and the like from the light source 26 reaches the photographic printing paper P when the black shutter 41 opens for a predetermined period of time so that an image recorded on the negative film N is printed on the photographic printing paper P where the area thus printed forms an image portion.

During the above processes, air in the supporting stand 46 is sucked to the transverse direction ends of the stand 46 from the inside of the loop of the endless belt 44 via the communication ducts 66 by the suction fan 68, and is blown outside so that the pressure inside the supporting stand 46 becomes negative. The negative pressure is conveyed to the photographic printing paper P on the endless belt 44 through the hole portions of the supporting stand 46 and the small holes on the endless belt 44 so that the photographic printing paper P is sucked to the endless belt 44 as shown by arrows A in FIG. 1. Accordingly, the photographic printing paper P is not only placed on the endless belt 44 but is also sucked toward the endless belt 44 so that the photographic printing paper P is reliably conveyed by the endless belt 44 and is, at the same time, placed in a horizontal state at the print-exposing position.

After the image has been printed on the photographic printing paper P, the photographic printing paper P is nipped between the guide roller 56 and the press roller 58 and is conveyed in the vertical direction due to the conveying direction being changed from the horizontal direction to the vertical direction. Thereafter, as shown by the letter K which represents the conveying path of the photographic printing paper P, the photographic printing paper P is conveyed to the processor station 72 in which development, bleach-fixing, washing and drying processings are respectively carried out, through a passage 60 comprising a plurality of pairs of rollers.

In the aforementioned processes, the print-exposing process of one frame of the image of the negative film N is completed. By repeating these processes, print-exposed photographic printing papers P are conveyed to the processing station 72 one by one in succession.

Developing solution is accommodated developing tank 74 of the processing station 72, and the photographic printing paper P is immersed in the developing solution so that development processing is carried out. The developed photographic printing paper P is transported into a bleach-fixing tank 76 adjacent to the developing tank 74. Bleach-fixing solution is accommodated in the bleach-fixing tank 76, and the photographic printing paper P is immersed in the bleach-fixing solution so that bleaching processing and fixing processing are carried out. The fix-processed photographic printing paper P is conveyed to the washing station 78 which is adjacent to the bleach-fixing tank 76 and which comprises a plurality of washing tanks, in each of which washing water is accumulated. The photographic printing paper P is immersed in the washing water in the washing tanks so that washing-processing is effected. Development replenishing solution, bleach-fixing replenishing solution and replenishing washing water are replenished from a plurality of replenishing solution tanks 90 installed in the processing station 72 to the developing tank 74, the bleach-fixing tank 76 and the washing tanks, respectively.

The wash-processed photographic printing paper P is conveyed to a drying station 80 located above the washing station 78. In the drying station 80, the photographic printing paper P is exposed to heated air blown along the direction shown by arrows B from the chamber 82 disposed under the conveying path of the photographic printing paper P, so that the photographic printing paper P is dried A conveying path 84 comprising a plurality of pairs of rollers is formed at the photographic printing paper P conveying direction downstream side of the drying station 80. The photographic printing paper P discharged from the drying station 80 is nipped by the plurality of pairs of rollers after drying processing is finished, and is discharged to the outside of the printer processor 10 to be stacked. When the photographic printing paper P processed by the respective processings such as developing, bleach-fixing and washing is a special type of paper (control strip) used for the purpose of checking deterioration of the developing solution and the like, the photographic printing paper P is sent to a densitometer 92 which is installed above the conveying path 84 and which measures the density of the photographic printing paper P.

In addition, when a special enlargement magnification to which the zoom lens 38 in the photographic printing station 12 is not applicable is required in the printing exposure, the supporting plate 34 is moved in the horizontal direction (in the direction perpendicular to the paper surface in FIG. 1) so that the prism 36 and the zoom lens 38 are withdrawn from the optical axis S. A lens (not shown) is installed on the optical axis S, and a photometric mirror 42 installed in the photographic printing station 12 is moved onto the optical axis S.

Figure 2:
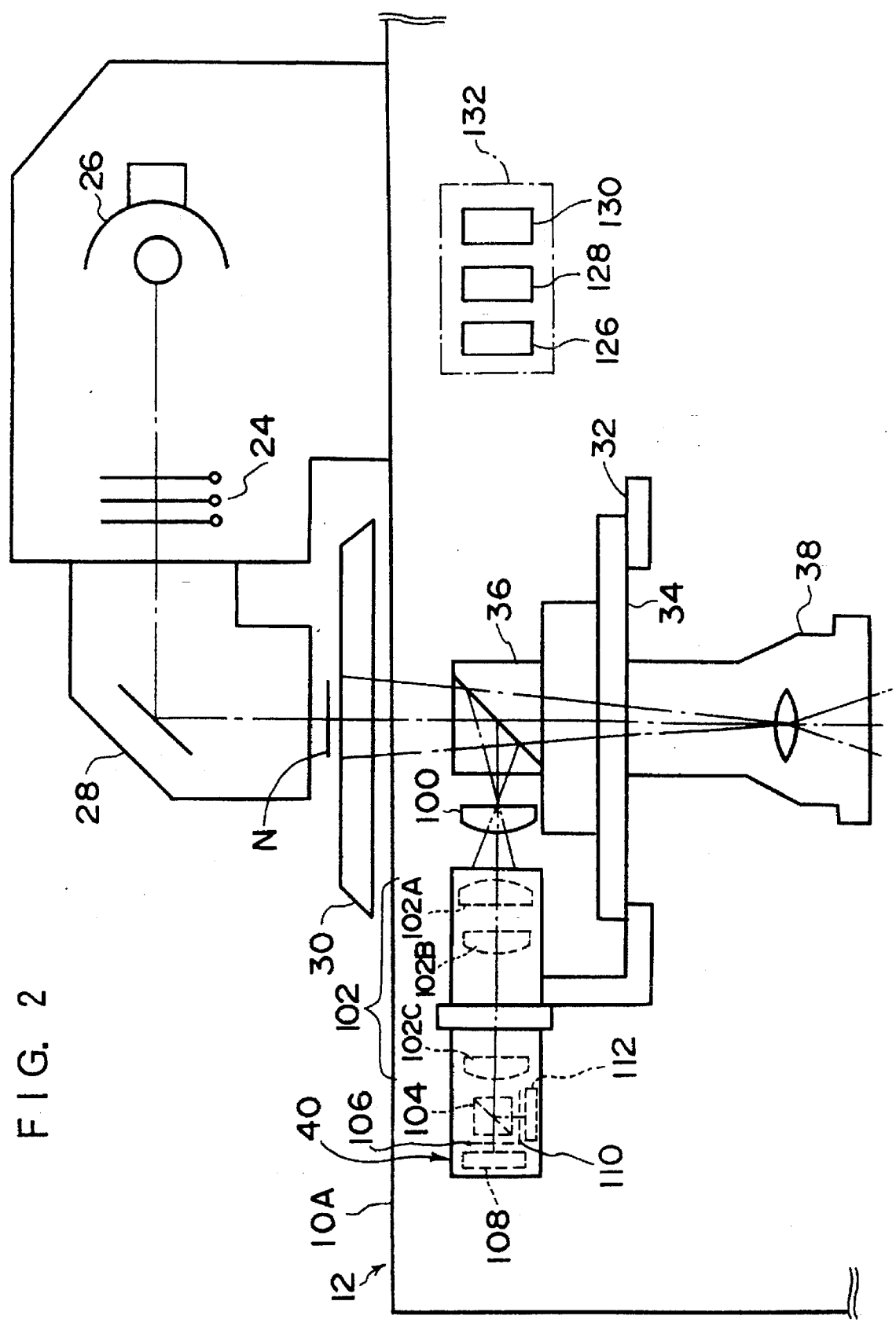
FIG. 2 is a magnified structural view of the photometric system of the photographic printing station in accordance with FIG. 1.

FIG. 2 is an enlarged view relating to the structure of the photometric optical system to which the present invention is applied. An optical path correcting lens 100 for correcting the optical path of the prism 36 is disposed between the prism 36 and the density measuring device 40. In the density measuring device 40, three lenses 102A, 102B and 102C for correcting the optical path are disposed in that order from the upstream side of the optical path such that the respective central axes thereof coincide with the optical axis. The relative positions of the optical path correcting lenses 102A, 102B and 102C are changeable along the optical path by means of a driver 130 for the optical path correcting lens which will be described later. When the relative positions are changed, the magnification of the optical path correcting lens system 102 comprising the optical path correcting lenses 102A, 102B and 102C is changed. In addition, a prism 104 is disposed at the down-stream side of the optical path correcting lens 102C in the density measuring device 40. The light incident upon the prism 104 is separated into two directions.

The respective measuring surfaces of the CCD 112 and the CCD 108 are disposed so as to be perpendicular to the optical axes of the light separated into two directions by the prism 104. The CCD 112 is provided to measure respective densities of red, green and blue colors of a number of pixels obtained by dividing an image recorded on the negative film N. The densities of red, green and blue colors measured by the CCD 112 are used for calculating the exposing condition. The CCD 108 is provided in order to pick-up the image recorded on the negative film N. The image (negative image) picked-up by the CCD 108 is displayed on a display 114 after the image is converted to a positive image in accordance with the exposing condition. The exposing condition is corrected by an operator based upon the image displayed on the display 114. The resolution of the CCD 108 is higher than that of the CCD 112.

In addition, a thin, plate-like color filter 110 is provided between the CCD 112 and the prism 104 in parallel with the measuring surface of the CCD 112. In a similar manner, a thin, plate-like color filter 106 is provided between the CCD 108 and the prism 104 in parallel with the measuring surface of the CCD 108. These color filters 110 and 106 are made up of gelatin filters, and a number of red, green and blue filters (not shown) are formed in a mosaic form on the surface of the gelatin filters. The set of the CCD 112 and color filter 110 and the set of the CCD 108 and color filter 106 respectively correspond to the photometric device in accordance with the present invention. Further, the CCD 112 and the CCD 108 are both connected to a controller 132 for executing a control routine in accordance with the present embodiment.

Figure 3:
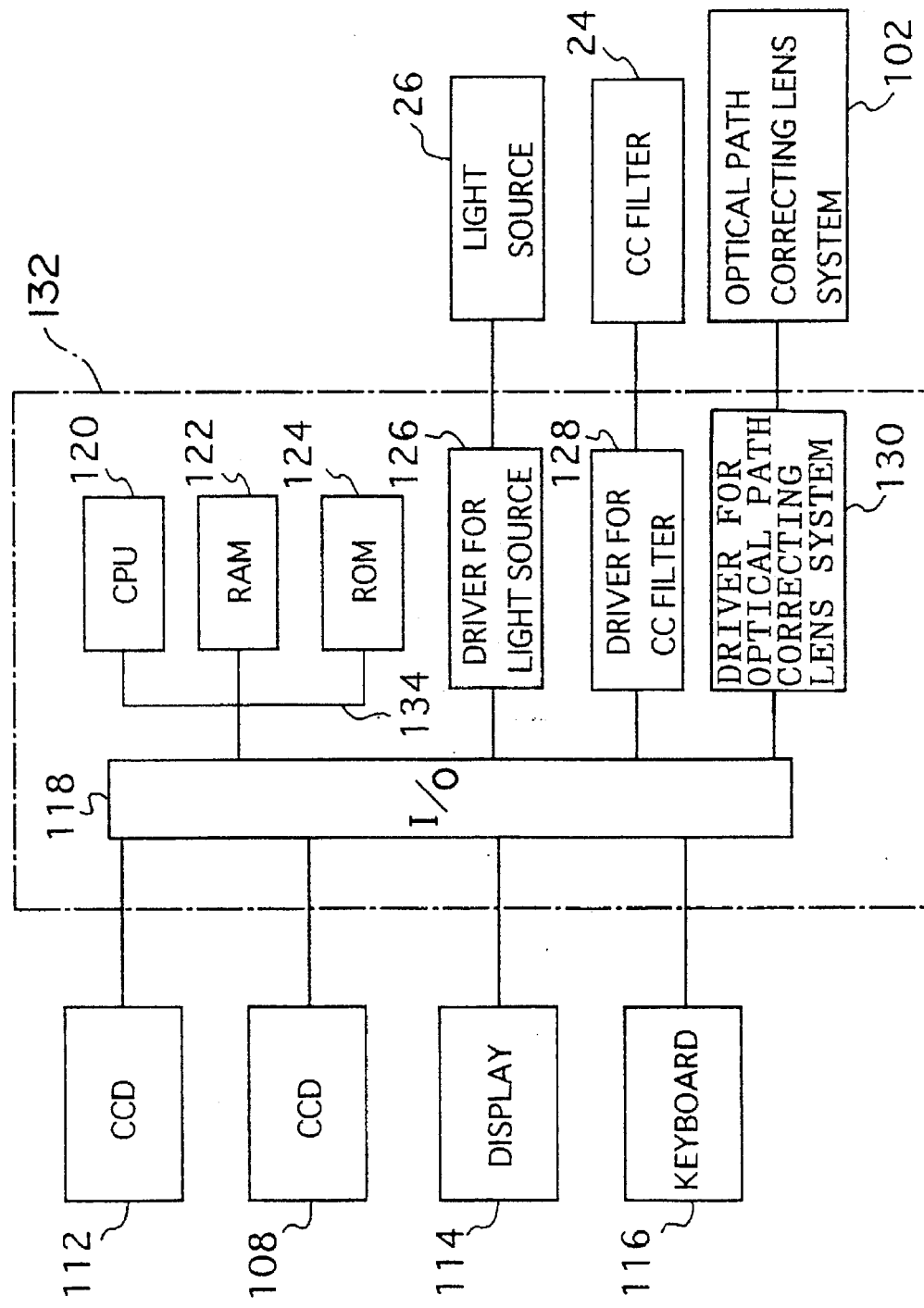
FIG. 3 is a block diagram showing the structure of the controller in accordance with one embodiment of the present invention.

The construction of the controller 132 for executing the control routine will be explained hereinafter with reference to FIG. 3. The controller 132 includes a CPU 120 which controls the overall operation of the photographic printing station 12 including the control routine which will be described later, a RAM 122, a ROM 124 which stores a control program and the like, an input and output controller 118 (hereinafter referred to as I/O), a driver 126 for the light source 26 which serves as an illuminance adjusting device for adjusting the illuminance of the light source 26, a driver 128 for the CC filter 24 which serves as a filter moving device which moves the CC filter 24 to open and close the CC filter 24, and a driver 130 for correcting the optical path which serves as a magnification changing device for changing the magnification of the optical path correcting lens system 102, and the like.

The CPU 120, the RAM 122, the ROM 124 and the I/O 118 are connected to each other via a bus 134. The driver 126 for the light source, the driver 128 for the CC filter and the driver 130 for the optical path correcting lens are connected to the I/O 118. Further, the CCD 112 and the CCD 108 are connected to the I/O 118. In addition, the display 114 for displaying an image of the negative film N picked-up by the CCD 108 and a keyboard 116 by which the operator inputs correction values for the exposing condition and the like are also connected to the I/O 118. A conveying mechanism for the negative film N, a conveying mechanism for photographic printing paper P, and the like are also connected to the I/O 118.

The driver 126 for the light source, the driver 128 for the CC filter and the driver 130 for the optical path correcting lens are connected to the light source 26, the CC filter 24 and the optical path correcting lens system 102, respectively.

Figure 4:
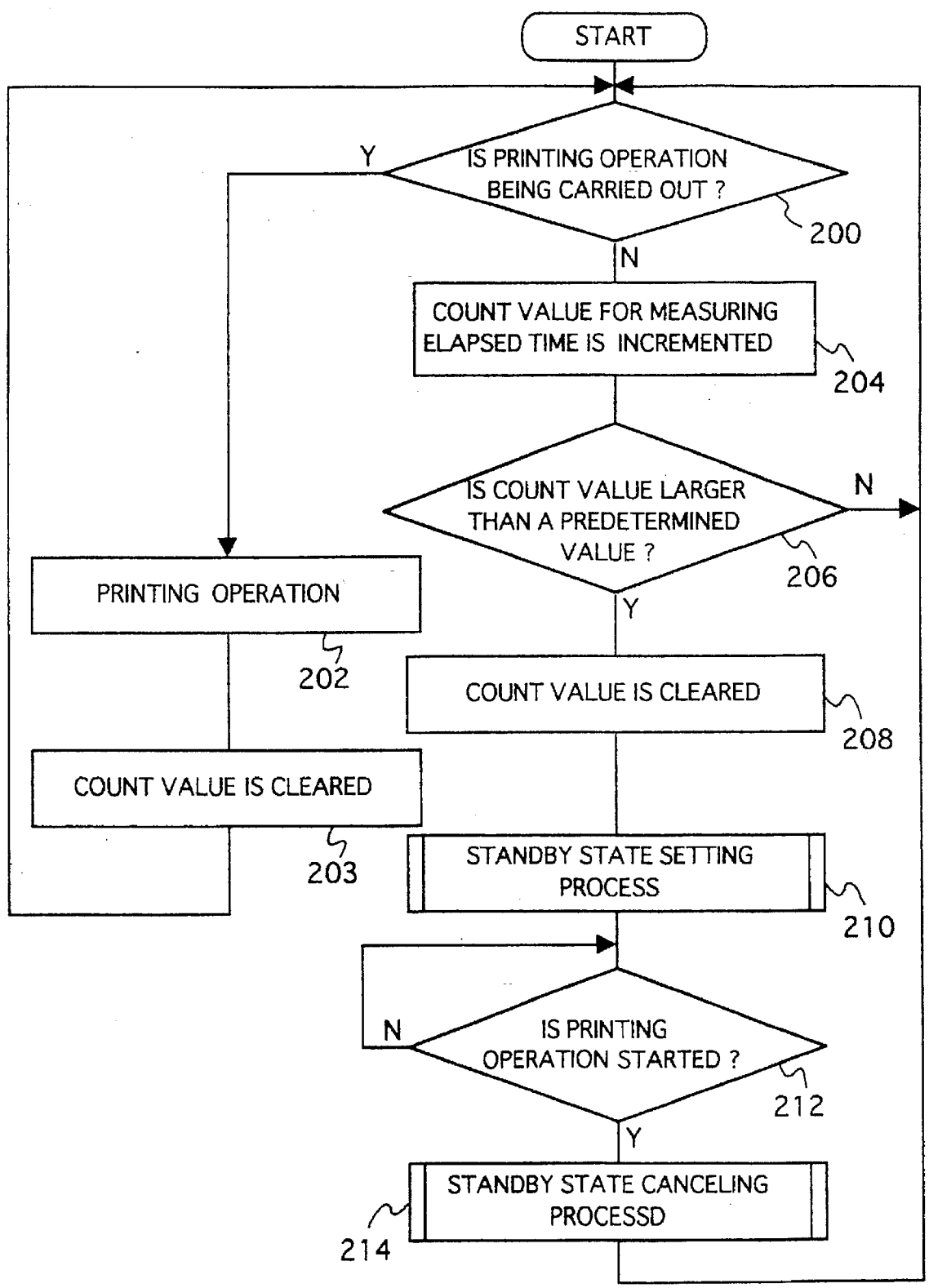
FIG. 4 is a flowchart showing a main routine in accordance with one embodiment of the present invention.

The operation of the present embodiment will be explained hereinafter with reference to the drawings. FIG. 4 shows the control routine executed by the controller 132. The execution of the control routine is started when the main power switch of the printer processor 10 is turned on. At Step 200, a determination is made as to whether printing operation is being carried out. When printing operation is being carried out, positive acknowledgment is made, and at Step 202, printing operation is performed. At the succeeding Step 203, a count value for measuring elapsed time, which count value is temporarily stored in the RAM 122, is cleared and thereafter, the process returns to Step 200. When printing operation is not being carried out, negative acknowledgment is made. The process proceeds to Step 204, the count value for measuring elapsed time is incremented by a predetermined value, and the count value is temporarily stored in the RAM 122. At the succeeding Step 206, judgment is made as to whether the count value temporarily stored in the RAM 122 is larger than the value corresponding to a predetermined time (for example, 2 minutes and 5 seconds). If the elapsed time after printing operation has been stopped does not exceed a predetermined time, negative acknowledgment is made, since the above-mentioned count value is not larger than the value corresponding to the predetermined value. In this case, the process returns to Step 200 and the routine begins again.

If the elapsed time after the printing operation has been stopped exceeds a predetermined time, positive acknowledgment is made, since the above-mentioned count value is larger than the value corresponding to the predetermined time. The process proceeds to Step 208 where the count value temporarily stored in the RAM 122 is cleared, and the standby state setting process is executed at the following Step 210.

Figure 5:
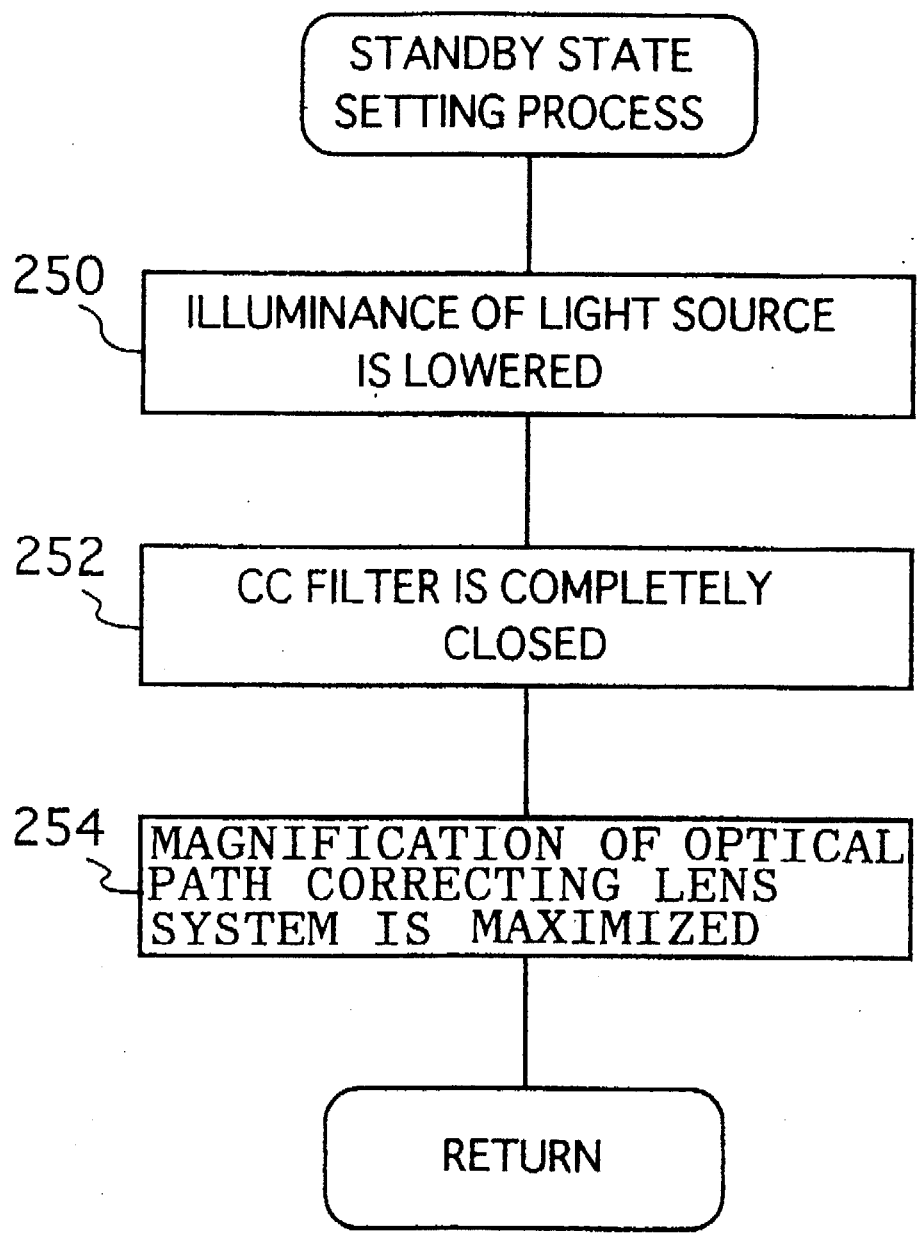
FIG. 5 is a flowchart showing a standby state setting process in accordance with the present invention.

As shown in FIG. 5, in the standby state setting process at Step 210, the illuminance of the light source 26 is lowered by the driver 126 for the light source at Step 250, and the CC filter 24 is completely closed by the driver 128 for the CC filter at the following Step 252. At the succeeding Step 254, the magnification of the lens system 102 is maximized by the driver 130 for the optical path correcting lens. In the above process, the quantity of light incident upon the color filters 106 and 110 and the CCD 112 and the CCD 108 is reduced to a quantity which is much lower than the quantity of light when printing exposure is carried out.

After the above setting process is completed, the process proceeds to Step 212 and a judgment as to whether printing operation is started is made. The judgment is continued until printing operation is started, and positive acknowledgment is made when printing operation is started. Thereafter, at Step 214, the standby state canceling process is executed.

Figure 6:
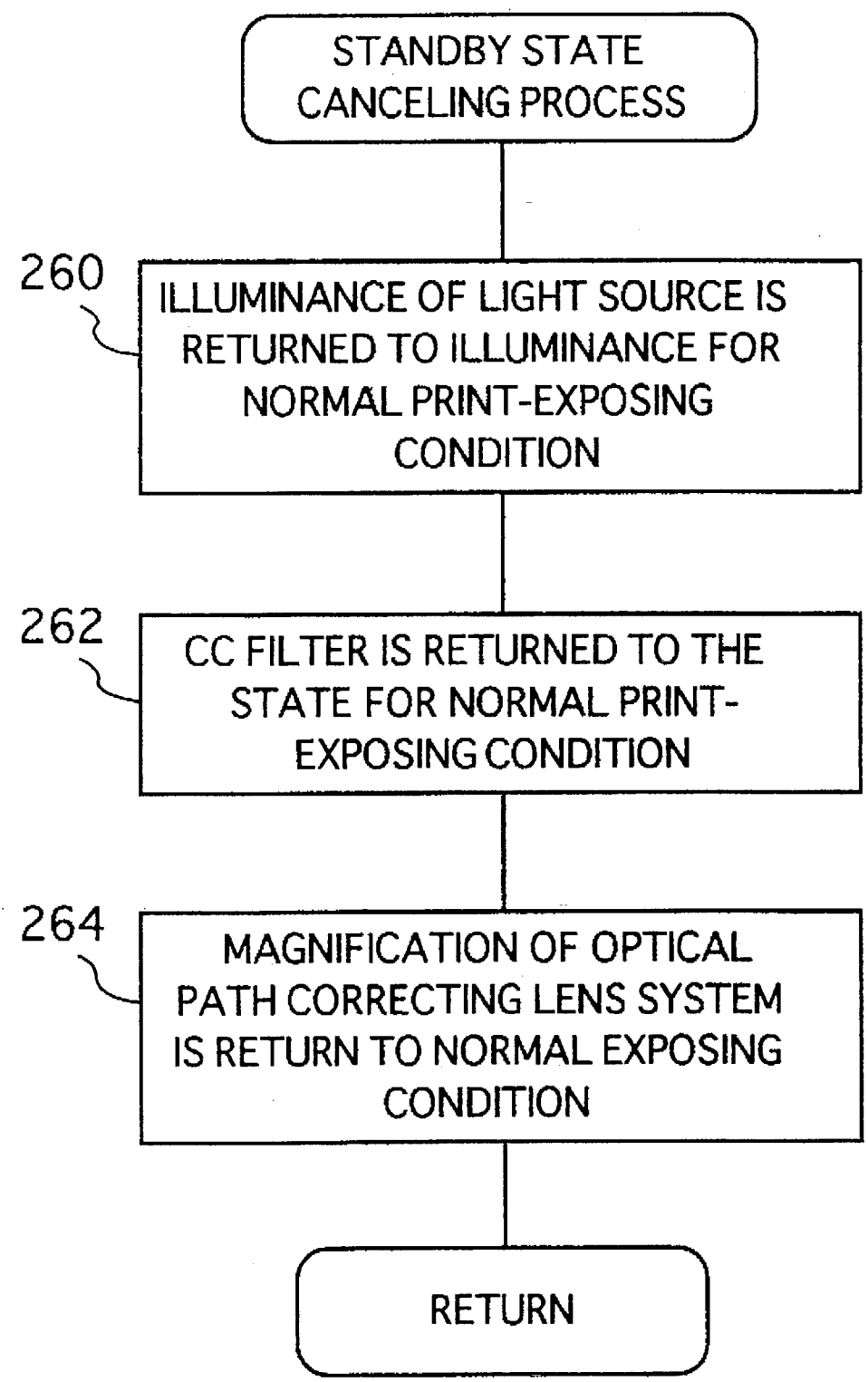
FIG. 6 is a flowchart showing a standby state canceling process in accordance with the present invention.

In the standby state canceling process at Step 214, as shown in FIG. 6, the illuminance of the light source 26 is returned to the illuminance for the normal print-exposing condition by the driver 126 for the light source at Step 260. At the succeeding Step 262, the CC filter 24 is returned to the state for the normal print-exposing condition by the driver 128 for the CC filter. Thereafter, at the following Step 264, the magnification of the optical path correcting lens system 102 is returned to the magnification for the normal print-exposing condition by the driver 130 for the optical path correcting lens. After the above canceling process has been completed, the process returns to Step 200.

As is clear from the above explanation, in the state (standby state) in which printing exposure is not carried out for a time longer than predetermined time, the quantity of light incident upon the color filters 106 and 110 and the CCD 112 and the CCD 108 is reduced to a quantity which is much lower than the quantity of light when printing exposure is performed. Therefore, deterioration of the functions of the color filters 106 and 110 and the CCD 112 and the CCD 108 due to sticking and the like can be diminished, and the life thereof can be extended. Further, labor for maintenance, such as replacement and inspection of the color filters 106 and 110 and the CCD 112 and the CCD 108, can be reduced. Moreover, a reduction in running costs in accompanies the reduction in the number of components which must be replaced.

Further, in the present embodiment, although an example in which printing exposure using a negative film N is used, a positive film can also be used.

Furthermore, in the present embodiment, an example of a photographic printing station is described in which the optical path correcting lens system 102 capable of changing magnification is provided at the side of the CCD 112 upon which light is incident for measuring the density of the negative film N. However, the present invention is also applicable to a photographic printing station without such an optical path correcting lens system in accordance with the first aspect of the present invention.

What is claimed is:

1. A photographic printer comprising:
   a print-exposing device which has a light source and a light controlling filter and in which an image recorded on a film is print-exposed onto a photosensitive material by irradiating light, which has been emitted from said light source and transmitted through said light controlling filter and the film, onto said photosensitive material;
   a photometric device upon which light transmitted through said light controlling filter and the film is incident, for photometrically measuring the image recorded on the film; and a control device for controlling a quantity of light incident upon said photometric device to reduce the quantity of light to a quantity of light which is lower than a quantity of light when printing exposure is carried out, when an elapsed time since said print-exposing device has performed a print exposure exceeds a predetermined time.

2. A photographic printer according to claim 1, wherein said control device has an illuminance adjusting device which adjusts the illuminance of said light source.

3. A photographic printer according to claim 1, wherein said control device has a filter moving device which moves said light controlling filter.

4. A photographic printer according to claim 1, further comprising:

a lens system provided at an optical path upstream side of said photometric device; and a magnification changing device for changing a magnification of said lens system;

wherein said control device changes the magnification of said lens system by means of said magnification changing device to reduce the quantity of light incident upon said photometric device to a quantity of light which is lower than a quantity of light when printing exposure is carried out, in a case in which printing exposure by said print-exposing device is suspended for a time longer than a predetermined time.

5. A photographic printer according to claim 4, wherein said magnification changing device changes the magnification by moving said lens system in the direction of the optical axis of said lens system.

6. A photographic printer according to claim 1, wherein said photometric device has an image pick-up element which detects an image on a film.

7. A photographic printer according to claim 6, wherein said photometric device has a color filter provided at an optical path upstream side of said image pick-up element.

8. A photographic printer according to claim 6, wherein said image pick-up element is a CCD.

9. A photographic printer according to claim 1, further comprising:

a light separating member which separates light emitted from the light source into light to be irradiated to the photosensitive material and light to be irradiated to said photometric device.

10. A photographic printer comprising:

a print-exposing device which has a light source and a light controlling filter and in which an image recorded on a film is print-exposed on a photosensitive material by irradiating light, which has been emitted from said light source and transmitted through said light controlling filter and the film, onto the photosensitive material;

a photometric device upon which light transmitted through said light controlling filter and the film is incident, for photometrically measuring the image recorded on the film;

an illuminance adjusting device for adjusting illuminance of said light source;

a filter moving device for moving said light controlling filter; and a control device for performing at least one of the following (a) and (b):

(a) controlling illuminance of said light source by means of said illuminance adjusting device to reduce the illuminance of said light source to illuminance of said light source which is lower than illuminance of said light source when printing exposure is carried out, when an elapsed time since said print-exposing device has performed a print exposure exceeds a predetermined time, and (b) controlling movement of said light controlling filter by means of said filter moving device to reduce a quantity of light transmitted through said light controlling filter to a quantity of light which is lower than a quantity of light when printing exposure is carried out, when an elapsed time since said print-exposing device has performed a print exposure exceeds a predetermined time.

11. A photographic printer according to claim 10, further comprising:

a lens system provided at an optical path upstream side of said photometric device; and a magnification changing device for changing a magnification of said lens system;

wherein said control device controls the magnification of said lens system by means of said magnification changing device so as to reduce a quantity of light incident upon said photometric device to a quantity of light which is lower than a quantity of light when printing exposure is carried out, in a case in which printing exposure by said print-exposing device is suspended for a time longer than a predetermined time.

12. A photographic printer according to claim 11, wherein said magnification changing device changes the magnification by moving said lens system in the direction of the optical axis of said lens system.

13. A photographic printer according to claim 10, wherein said photometric device has a CCD for detecting an image on a film.

14. A photographic printer according to claim 13, wherein said photometric device has a color filter provided at an optical path upstream side of said CCD.

15. A photographic printer according to claim 10, further comprising:

a beam splitter for separating light emitted from said light source into light to be irradiated to the photosensitive material and light to be irradiated to said photometric device.

16. A method of controlling a photographic printer comprising the steps of:

providing a print-exposing device which has a light source and a light controlling filter and in which an image recorded on a film is print-exposed onto a photosensitive material by irradiating light, which has been emitted from said light source and transmitted through said light controlling filter and the film, onto said photosensitive material, and providing a photometric device upon which light transmitted through said light controlling filter and the film is incident, for photometrically measuring the image recorded on the film;

judging whether printing exposure by said print-exposing device has been suspended for a time longer than a predetermined time; and controlling a quantity of light incident upon said photometric device so as to reduce the quantity of light to a quantity of light which is lower than a quantity of light when printing exposure is carried out, in a case in which printing exposure by said print-exposing device is suspended for a time longer than said predetermined time.

17. A method of controlling a photographic printer according to claim 16, wherein said control is effected by changing illuminance of light from said light source.

18. A method of controlling a photographic printer according to claim 16, wherein said control is effected by moving said light controlling filter.

19. A method of controlling a photographic printer according to claim 16, wherein said control is effected by changing a magnification of a lens system provided at an optical path upstream side of said photometric device.

20. A method of controlling a photographic printer according to claim 19, wherein the magnification of said lens system is changed by moving said lens system in the direction of the optical axis of said lens system.

* * * * *